United States Patent
Sakaguchi et al.

(10) Patent No.: US 7,212,234 B2
(45) Date of Patent: May 1, 2007

(54) IMAGE DEVICE HAVING A SELECTIVELY ADAPTED WHITE BALANCE CONTROL

(75) Inventors: Norihiro Sakaguchi, Yokohama (JP); Yuji Suzuki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 535 days.

(21) Appl. No.: 10/358,322

(22) Filed: Feb. 5, 2003

(65) Prior Publication Data
US 2003/0146984 A1    Aug. 7, 2003

(30) Foreign Application Priority Data
Feb. 5, 2002   (JP)   ............................. 2002-028004
Oct. 31, 2002  (JP)   ............................. 2002-317909

(51) Int. Cl.
*H04N 9/73* (2006.01)
(52) U.S. Cl. ............................. 348/223.1; 348/333.02; 396/374
(58) Field of Classification Search ............ 348/223.1, 348/225.1, 224.1, 333.02; 396/374; 358/516
See application file for complete search history.

(56) References Cited

U.S. PATENT DOCUMENTS

| 5,430,482 | A | * | 7/1995 | Kim ....................... 348/333.01 |
| 5,473,375 | A | * | 12/1995 | Takayama et al. .......... 348/365 |
| 5,479,206 | A | * | 12/1995 | Ueno et al. ............... 348/211.5 |
| 5,534,916 | A | | 7/1996 | Sakaguci |
| 5,644,359 | A | * | 7/1997 | Ito .......................... 348/223.1 |
| 5,691,772 | A | | 11/1997 | Suzuki |
| 5,751,349 | A | | 5/1998 | Matsui et al. |
| 5,774,623 | A | | 6/1998 | Maeda et al. |
| 6,009,233 | A | | 12/1999 | Tsujimura et al. |
| 6,075,562 | A | | 6/2000 | Sakaguchi et al. |

(Continued)

FOREIGN PATENT DOCUMENTS

JP           07143496 A    *    6/1995

(Continued)

OTHER PUBLICATIONS

U.S. Appl. No. 09/200,751, filed Nov. 30, 1998, Horiguchi et al.

(Continued)

*Primary Examiner*—Ngoc-Yen Vu
*Assistant Examiner*—Gary C. Vieaux
(74) *Attorney, Agent, or Firm*—Oblon, Spivak, McClelland, Maier & Neustadt, P.C.

(57) ABSTRACT

An imaging device is provided for reproducing light incident thereto as an image. The image device included a photodetector adapted to translate incident light of an image to a representative electronic signal. A white balance control configures the white balance of the representative electronic signal in accordance with a white balance gain value. A selector interface is operably linked to the white balance control. The selector interface selects among a plurality of predetermined values to set the white balance gain value in accordance with an imaging application. An adjustment interface adjusts the selected value of the plurality of predetermined values. A display of the imaging device provides information of the set value. The information includes a variable range of the set white balance gain value, the variable range including an indication the selected value of the plurality of predetermined values and a graphical representation thereof, relative to the degree of adjustment applied via the adjustment interface.

17 Claims, 5 Drawing Sheets

U.S. PATENT DOCUMENTS

| | | | |
|---|---|---|---|
| 6,075,958 A | 6/2000 | Gotoh et al. | |
| 6,113,094 A | 9/2000 | Horiguchi et al. | |
| 6,154,210 A * | 11/2000 | Anderson | 715/840 |
| 6,260,843 B1 | 7/2001 | Hoshimura et al. | |
| 6,328,298 B1 | 12/2001 | Suzuki et al. | |
| 6,486,419 B2 | 11/2002 | Horiguchi et al. | |
| 6,535,245 B1 * | 3/2003 | Yamamoto | 348/223.1 |
| 6,624,846 B1 * | 9/2003 | Lassiter | 348/211.4 |
| 6,757,020 B1 | 6/2004 | Kikuchi | |
| 6,862,039 B2 * | 3/2005 | Shimizu | 348/223.1 |
| 6,928,187 B2 * | 8/2005 | Cooper et al. | 382/167 |
| 7,042,500 B1 * | 5/2006 | Niikawa | 348/211.4 |
| 2001/0030694 A1 | 10/2001 | Abe | |
| 2001/0038064 A1 | 11/2001 | Mori et al. | |
| 2003/0011678 A1 * | 1/2003 | Chun | 348/143 |
| 2003/0011686 A1 * | 1/2003 | Higuchi | 348/223.1 |
| 2004/0085459 A1 * | 5/2004 | Hoshuyama et al. | 348/223.1 |

FOREIGN PATENT DOCUMENTS

| | | |
|---|---|---|
| JP | 2000156870 A * | 6/2000 |
| JP | 2001-177846 | 6/2001 |

OTHER PUBLICATIONS

U.S. Appl. No. 10/206,758, filed Jul. 29, 2002, Horiguchi et al.
U.S. Appl. No. 10/235,715, filed Sep. 6, 2002, Sakaguchi
U.S. Appl. No. 10/358,322, filed Feb. 5, 2003, Sakaguchi et al.
U.S. Appl. No. 10/761,329, filed Jan. 22, 2004, Sakaguchi.

* cited by examiner

IMAGE DEVICE HAVING A SELECTIVELY ADAPTED WHITE BALANCE CONTROL

BACKGROUND OF THE INVENTION

The present invention relates to an imaging device, and, more particularly to a digital camera and associated method of enabling a selectively and/or manually adapted white balance control for improving image reproduction.

Electronic imaging devices such as digital cameras are becoming increasingly commonplace for capturing still images. Such devices typically employ a photodetector for converting light incident to a lens thereof into an electronic signal representative of an image. Yet, processing incident light in this manner often results in the photodetector erroneously converting the natural image color. As color of the incident light is translated by the photodetector in accordance with a color temperature of a light source rather than natural color as observed by the human eye, variability in natural color reproduction often results; this variability is known in the art as "white balance." Accordingly, imaging devices employ a white balance control in order to compensate for this condition.

For example, in color processing, a ratio of Red:Green:Blue (R:G:B) color values, typically, the ratio is adjusted to 1:1:1 by controlling the white balance of (R) and (B) color components via a signal processing system of the imaging device. Thus, automatic white balance control is based on the assumption that all colors in a screen display are integrated into achromatic color. However, an image which departs from this condition, such as an image which exhibits a disproportionate monochromatic color of red for example, or an image subject to a particular lighting condition, would still suffer from improper color reproduction. Although control is achieved through a simultaneous control of (R) and (B) color components as above mentioned, and flexibility in controlling white balance may be further improved by independent adjustment of (R) and (B) color component gain, even such independent adjustment often does not yield desirable natural color reproduction.

Thus, to prevent the introduction of improper white balance, further imaging processes are employed. For example, an area division is performed for partitioning a display of the imaging device to process the partitions individually, likewise, a determination may be made in accordance with an algorithm as to whether data is to be utilized as control data for the automatic white balance based on a degree of color saturation. Yet, even with these additional processes, it is still difficult to control the automatic adaptation of white balance, resulting in improper natural color reproduction in the captured image.

As such, most imaging devices such as digital video cameras and digital still cameras employ a manual white balance control function and/or a preset white balance control function. The manual white balance control function enables an operator to independently adjust white balance. Conversely, the preset white balance control function may set a white balance gain to predetermined value depending upon the application, for example, imaging outdoors or under fluorescent lighting. In this way, such manual and/or selectable white balance controls help the imaging device to reproduce images that are not particularly well suited to automatic white balance control. However, in manual and selectable white balance control schemes, operators have difficulty creating consistent results due to the inability to identify settings and/or manipulate the white balance in a systematic manner.

As such, a white balance control and related methodology are desired for integration with an imaging device, the control being devoid of the aforementioned limitations, capable of providing an improved natural color reproduction, and employing a simplified manual setting operation.

BRIEF SUMMARY OF THE INVENTION

An exemplary embodiment of the present invention provides, an imaging device for reproducing light incident thereto as an image signal. The image device included a photodetector adapted to translate incident light of an image to a representative electronic signal. A white balance control configures the white balance of the representative electronic signal in accordance with a white balance gain value. A selector interface is operably linked to the white balance control. The selector interface selects among a plurality of predetermined values to set the white balance gain value in accordance with an imaging application. An adjustment interface is provided for manually adjusting the selected on of the plurality of predetermined values. A display of the imaging device provides information of the set value. The information includes a variable range of the set white balance gain value, the variable range including an indication of the selected value of the plurality of predetermined values and a graphical representation thereof, relative to the degree of adjustment applied via the adjustment interface.

According to another aspect of the invention, a method of setting a white balance gain value of an imaging device is provided. Incident light of an image is translated to a representative electronic signal. The white balance of the representative electronic signal is configured in accordance with a white balance gain value. A selected value of a plurality of predetermined values is provided to set the white balance gain value in accordance with an imaging application. The selected value of the plurality of predetermined values is manually adjusted. Information of the set value is displayed, wherein a variable range of the set white balance gain value is provided, the variable range including an indication of the predetermined value, and a graphical representation of the predetermined set value mark relative to the degree of adjustment applied via the operation means.

It is to be understood that both the foregoing general description of the invention and the following detailed description are exemplary, but are not restrictive, of the invention.

BRIEF DESCRIPTION OF THE SEVERAL VIEWS OF THE DRAWING

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Certain terminology used in the following description is for convenience only and is not limiting. The term "photodetector" as used herein refers to devices capable of translating an incident image signal into an electronic representation thereof. In the drawings, the same reference numerals are used for designating the same elements throughout the several figures.

This application claims the benefit of the earlier filing date of Japanese Patent Applications Nos. 2002-028,004 and 2002-317,909, filed Feb. 5, 2002 and Oct. 31, 2002, respectively, the entirety of which are incorporated herein by reference.

The present invention provides a white balance control system and associated methodology by which a selectively adjusted and/or manually adjusted white balance gain value can be performed in a user friendly and predictable manner. While the invention is described in terms of an imaging device such as a digital still camera for the pedagogical purpose of illustrating the invention, those skilled in the art will recognize that the present invention is equally applicable to a variety of image processing and/or video applications.

I. Imaging Device

Figure 1:
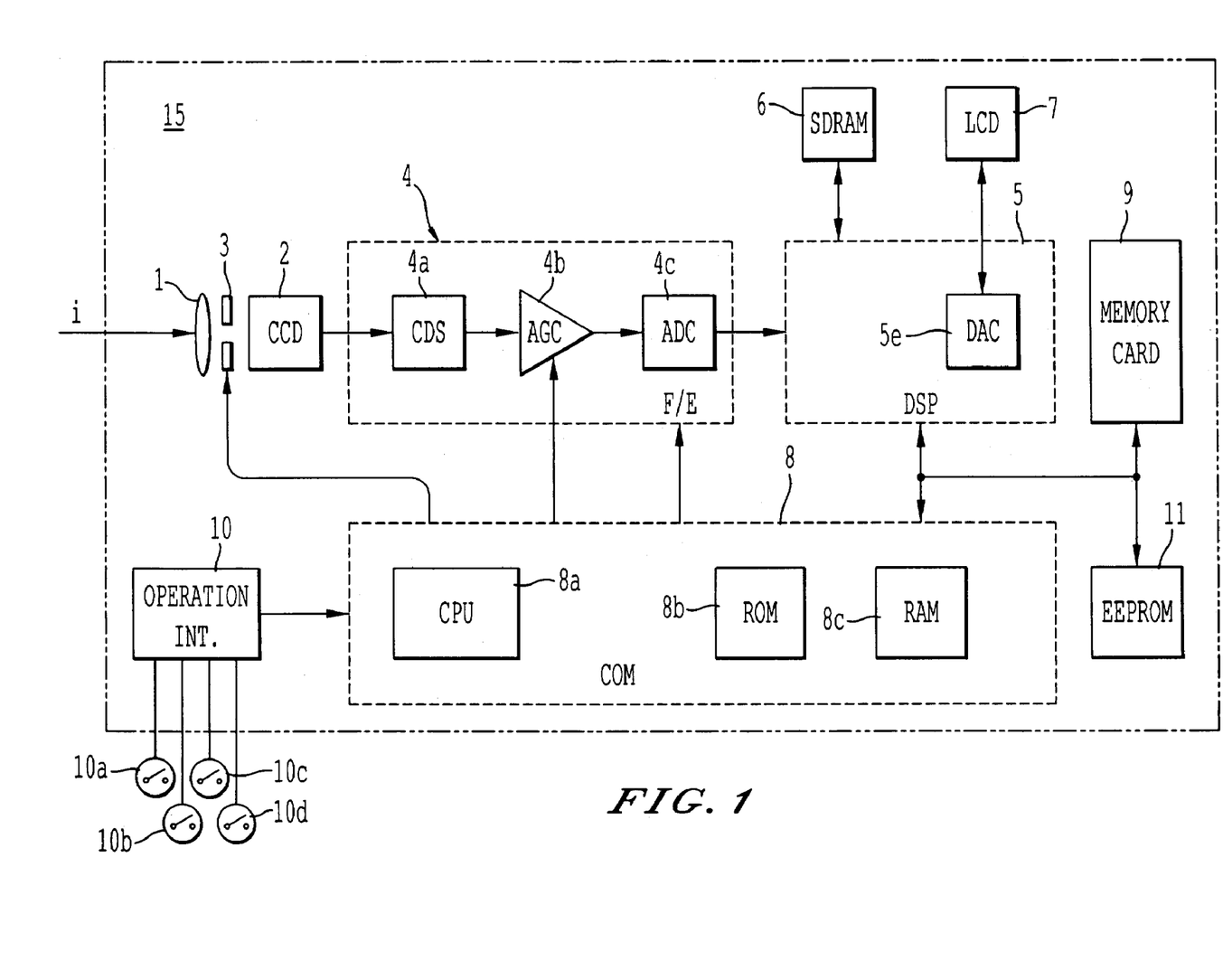
FIG. 1 is a high level block diagram of an imaging device in accordance with an exemplary embodiment of the present invention.

Referring now more specifically to the drawings, FIG. 1 is a high level block diagram of an imaging device 15 in accordance with an exemplary embodiment of the invention. The imaging device 15 includes a lens 1, shutter 3, photodetector 2, front end (F/E) 4, digital signal processing (DSP) module 5, memory 6, display 7, memory card 9, operator interface 10, processing module (COM) 8, and system memory 11. As FIG. 1 is a high level block diagram, those skilled in the art will recognize that the single lines shown connecting components are symbolic only, of course multiple interfaces, connections, and communication buses may be employed as necessary.

In operation, an incident light signal, represented by the arrow i, is provided to a lens 1. The lens 1, while shown as a single component, may be a lens assembly including multiple lens devices such as required of a zoom lens, however the functionality of the lens assembly is discussed here as if it were a single optical device for purposes of simplicity. A shutter 3 is provided in the usual manner, for controlling a light intensity provided from lens 1 for communication to the photodetector 2.

The photodetector 2 is responsive to the light intensity for converting the incident light signal i into an electronic representation thereof. In the exemplary embodiment, the photodetector 2 is a charge coupled device (CCD). In this way, the CCD 2 employs an imaging face including a plurality of photoelectric transfer pixels arrayed as a two-dimensional matrix. The CCD 2 translates the incident light signal i of an image face, to an electronic signal. The CCD 2 provides the electronic signal as analog image data to an output thereof. The analog image data output from the CCD 2 is provided to a front-end circuit (F/E) 4. In an alternative embodiment, the image data may be converted to digital form prior to communication to the (F/E) 4 by integral circuitry of photodetector 2.

The (F/E) 4 is responsive to the output of the CCD 2 and, in the exemplary embodiment, includes a correlated double sampler 4a, automatic gain control 4b, analog to digital converter 4c.

The correlated double sampling circuit (CDS) 4a is provided to remove noise from the signal output from CCD 2 (image data) provided to (F/E) 4 in a manner known to those skilled in the art. The automatic gain control circuit (AGC) 4b functions to control adjust the brightness gain of the image data. Finally, the analog/digital converter (ADC) 4c converts analog image data into digital image data, the digital image data being provided to a digital signal processor (DSP) 5.

The exemplary DSP 5 (as shown in greater detail in FIG. 2) includes a digital to analog converter (DAC) 5e. The DSP 5 controls the white balance of the digital image data input thereto using memory 6. In the exemplary embodiment, memory 6 is a Synchronous Dynamic Random Access Memory (SDRAM) which stores digital image data temporarily, of course the functionality of memory 6 may be performed by any one of a plurality of memory mediums known in the art, whether volatile or non-volatile. The DSP 5 also performs image processing for the imaging device 15 such as a compression processing and extension processing. The DSP 5 further displays the processed image data on a display 7.

In the exemplary embodiment, the display 7 is provided to exhibit control data and user menus of the imaging device 15 and to provide viewfinder functionality. To this end, a liquid crystal display (LCD) is utilized, of course alternative display technologies may be employed such as plasma display technology which is equally applicable to the teachings of the present invention. Of course, the CPU 8a also may display the present set value display image 200 (shown in greater detail in FIG. 3) on another display means operably linked to an appropriate interface of imaging device 15. In the exemplary embodiment, display 7 employs a touch screen interface for presenting graphical user interfaces (GUIs) as discussed further herein.

The processing module (COM) 8 controls the operation of the imaging device 15. In the exemplary embodiment, the COM 8 includes a CPU 8a, a memory 8b, and memory 8c. In operation, the COM 8 controls the actuation and timing signals of the CCD 2, the CDS 4a, the AGC 4b and the ADC 4c. The CPU 8a functions in accordance with an instruction set to execute the functionality of the imaging device 15. For example, the CPU 8a functions to calculate set values used during the white balance control, an automatic exposure control, an automatic focus control and the like. The CPU 8a also has a function of setting the calculated set values utilized by DSP 5 as explained in more detail herein. In the exemplary embodiment, memory 8b is a non-volatile read only memory (ROM) for storing the instruction set or "control program" of the CPU 8a which may be implemented as firmware or as software running on an operating system of the imaging device 15. Likewise the memory 8c is a volatile random access memory which is employed as a "scratch pad" as known to those skilled in the art. Additionally, the control program may be recorded on alternative media such as optical disc technology such as a CD-ROM, DVD-ROM and the like, or on a magnetic disc technology such as a hard disc. In the exemplary embodiment, the instruction set is installed in memory 8b at manufacture, or provided via the Internet and/or personal computer by a suitable communication interface (not shown), or wireless transmission such as Bluetooth®.

The COM 8 is operably linked with a memory card 9. In the exemplary embodiment, the memory serves as a removable media for storing image data output from the DSP 5. In an alternative embodiment, the memory card 9 may be fixed and employ an interface for transferring image data to a personal computer (PC), PDA, cellular phone or the like. The COM 8 is also operably linked with an operation interface 10.

The exemplary operation interface 10 includes a selector interface 10a for manually selecting among a plurality of predetermined values to set the white balance gain value in accordance with an imaging application, an adjustment interface 10b for manually adjusting a selected value, a preset interface 10c configured to set each one of the plurality of predetermined values, and a mode selection interface 10d for selecting between a manual white balance setting mode and an imaging mode. Of course, the operation interface 10 will include image capture, focusing control and like functionality for proper operation of the imaging device 15 as known to those skilled in the art. While selection interfaces 10a–10d are graphically depicted as physical components in FIG. 2 for illustration purposes, in the exemplary embodiment, these interfaces are (GUIs) of the display 7.

The COM 8 is operably linked to memory 11. In the exemplary embodiment, memory 11 is an electrically erasable programmable read only memory (EEPROM) functioning to store various parameters and predetermined values.

Figure 2:
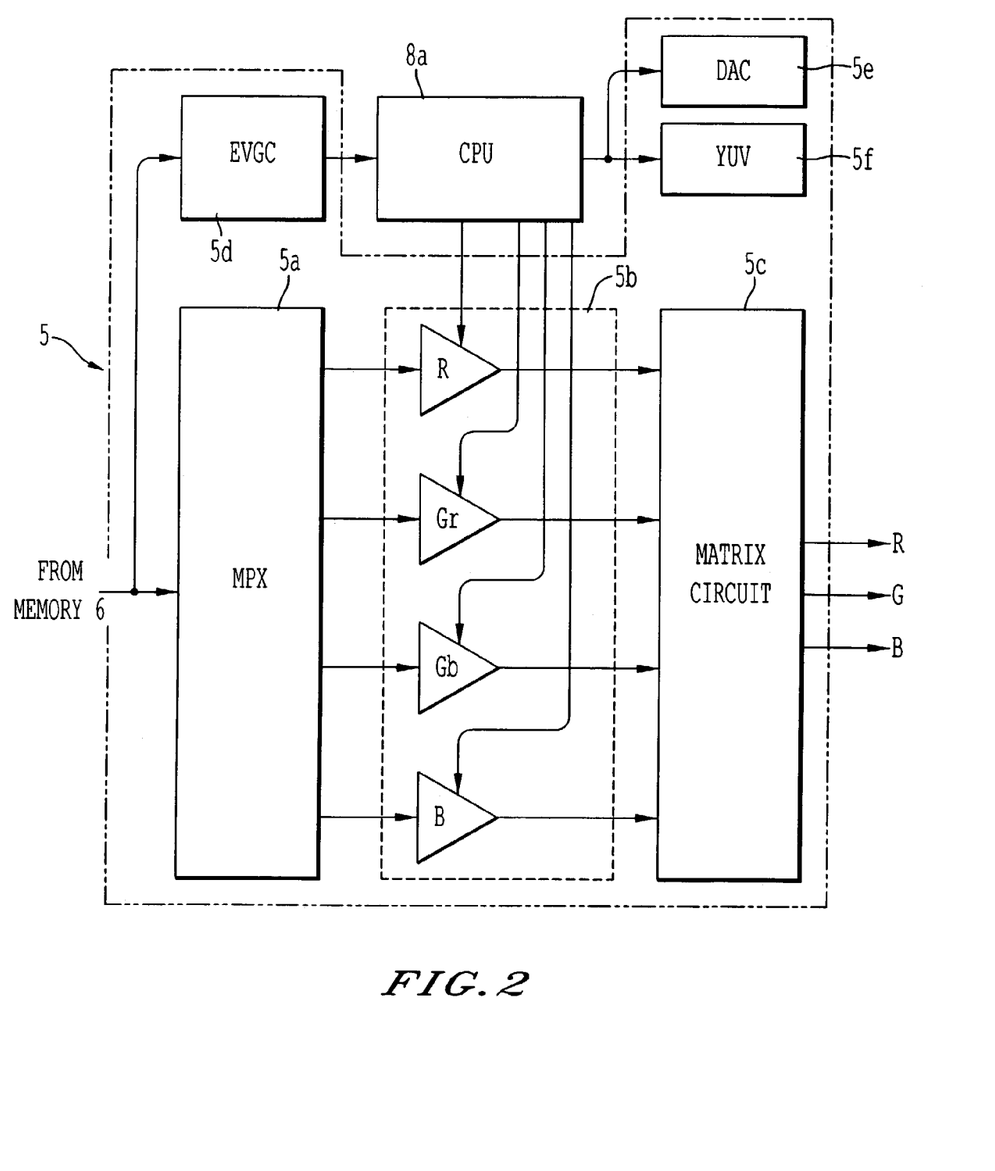
FIG. 2 is a block diagram of the DSP 5 of FIG. 1.

Referring now to FIG. 2, a block diagram of DSP 5 is shown for demonstrating the functionality of the selectively adapted white balance control of the exemplary embodiment. The exemplary white balance control includes a multiplexer (MPX) 5a, a gain control circuit 5b, a matrix circuit 5c, an evaluation value generation circuit 5d, a digital to analog converter 5e, and a brightness control circuit 5f (YUV).

In accordance with the instruction set of CPU 8a, the MPX 5a generates color signals red (R), Green Red (Gr), Green Blue (Gb) and Blue (B) in accordance with image data output from F/E 4 in conjunction with data stored in memory 6. In the exemplary embodiment, the evaluation value generation circuit 5d generates evaluation values ΣR, ΣG and ΣB corresponding to R, G and B of the image data output from the F/E 4 by way of memory 6. The gain control circuit 5b, controls white balance gains corresponding to the (R), (Gr), (Gb) and (B) respectively according to the set values from the CPU 8a. The matrix circuit 5c converts the (R), (Gr) (Gb) and (B) ratio signals into color signals red (R), green (G) and blue (B). The YUV circuit 5f provides translation of (R), (G), and (B) signals into YUV format (Y signal, U signal and V signal corresponding to brightness). The DAC 5e providing the processed image data in analog form for output. In this way, color signals are adapted in accordance with data of memory 6, and the above identified functionality of DSP 5.

II. Operation

In operation, the imaging device 15 or digital still camera captures a still image as the CCD 2 is set to an imaging mode for actuating photoelectric translation of light incident thereto. This operation may be initiated by actuation of a power switch of the operation interface 10 (not shown) and the mode selection interface 10d. The CCD 2 generates image data by translating an optical image formed on the imaging face of the CCD 2 to an electronic signal. This electronic representation of the image is then provided to the DSP 5 through the F/E 4. In the exemplary embodiment, the timing of this transfer is one image each 30 seconds (1/30 seconds scale). The DSP 5 stores the image data, corresponding to the arrangement of matrix on the CCD 2, output from the (F/E 4) in the memory 6. The DSP 5 retrieves the image data stored in the memory. The MPX 5a of DSP 5 generates (R), (Gr), (Gb), and (B) values according to the image data and provides these values to the gain control circuit 5b. The gain control circuit 5b controls the white balance of the image data by adjusting white balance gains corresponding to (R), (Gr), (Gb) and (B) respectively according to the set values from the CPU 8a and amplifies (R), (Gr), (Gb) and (B) using the adjusted white balance gains. The matrix circuit 5c converts the adjusted values of (R), (Gr), (Gb) and (B) into (R), (G) and (B). The converted (R), (G) and (B) are stored in the memory 6. This stored image data of memory 6 is then retrieved by the DSP 5 for conversion into YUV format for output to the display 7. YUV circuit 5f in the DSP 5 converts the (R), (G), and (B) image data into a YUV signal and stores back in the memory 6. The image data can then be provided to the display 7 in YUV format after conversion to analog form by digital analog converter (DAC) 5e. The LCD displays an image based on the input image data. This process repeats on each 1/30 seconds scale. Through this process, images taken by the CCD 2 are displayed on the LCD 7 during the image capture mode.

When an image capture operation produces an image which is to be stored, a release button (not shown) of the operation interface 10 is executed, image data converted to YUV signals are provided not only to the display 7 but also to an image compression circuit (not shown) in the DSP 5 corresponding to the operation for creating a compressed version of the image data. The image compression circuit executes an image compression process based on JPEG standard for image data transmitted to the image compression circuit after YUV conversion. Of course those skilled in the art will recognize that alternative compression formats exist and may be equally supported by the teachings of the present invention. The image data compressed by the image compression circuit is then stored in memory 6. The compressed image data in the memory 6 is then provided for storage via DSP 5 to memory card 9.

Figure 3:
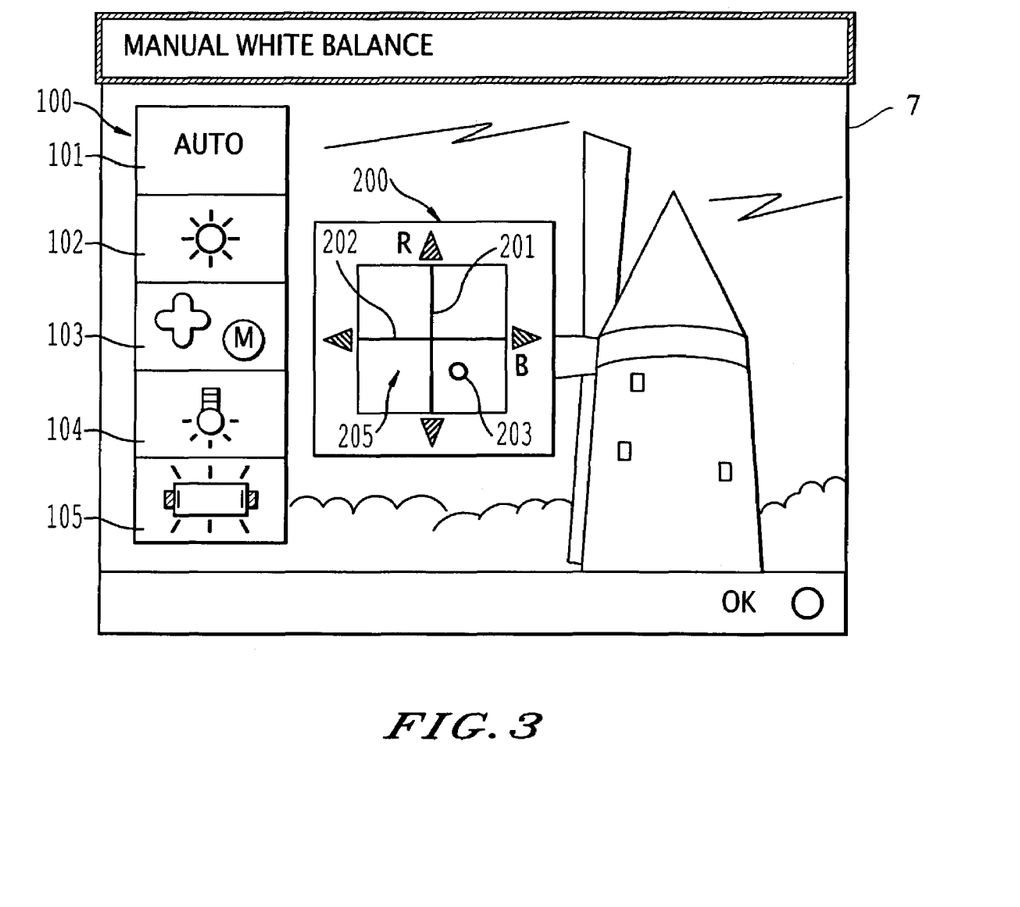
FIG. 3 is an exemplary screen shot of a display of the imaging device in accordance with an exemplary embodiment of the invention.

When a white balance selective mode is actuated via mode selection interface 10d, a selected image 200 as shown in FIG. 3 is superimposed on a taken image on the display 7. In the exemplary embodiment, the white balance selective mode may select a mode of a given white balance. One mode can be selected from among an automatic white balance (AWB) mode 101, an outdoor mode 102 (hereinafter 'preset white balance' is referred to as 'PWB'), a manual white balance (MWB) mode 103, an incandescent lamp PWB mode 104, and a fluorescent lamp PWB mode 105.

In AWB mode 101, the CPU 8a sets the white balance gains corresponding to color components (R) and (B) as a proportion of (R), (G) and (B) output from the matrix circuit 5c to 1: 1: 1 based on the evaluation values generated in the evaluation value generation circuit 5d every time the image data are input to DSP 5. Depending upon the mode selection (i.e., 101–105) the CPU 8a outputs set values corresponding to the set gains to the gain control circuit 5b. For example, in the outdoor PWB mode 102, the CPU 8a sets the white balance gains corresponding to (R) and (B) color components on predetermined values for image capture outdoors. In MWB mode 103, the CPU 8a sets the white balance gains corresponding to (R) and (B) on values a user determines using an adjustment interface 10b of operation interface 10. In the incandescent lamp PWB mode 104, the CPU 8a sets the white balance gains corresponding to R and B on predetermined values for image capture of scenes illuminated by incandescent lamp. In the fluorescent lamp PWB mode 105, the CPU 8a sets the white balance gains corresponding to R and B on predetermined values for shooting under fluorescent lamp. In selected image 100 in FIG. 3, 101 stands for the AWB mode, 102 stands for the open air PWB mode, 103 stands for the MWB mode, 104 stands for the incandescent lamp PWB mode, and 105 stands for the fluorescent lamp PWB mode.

Figure 4:
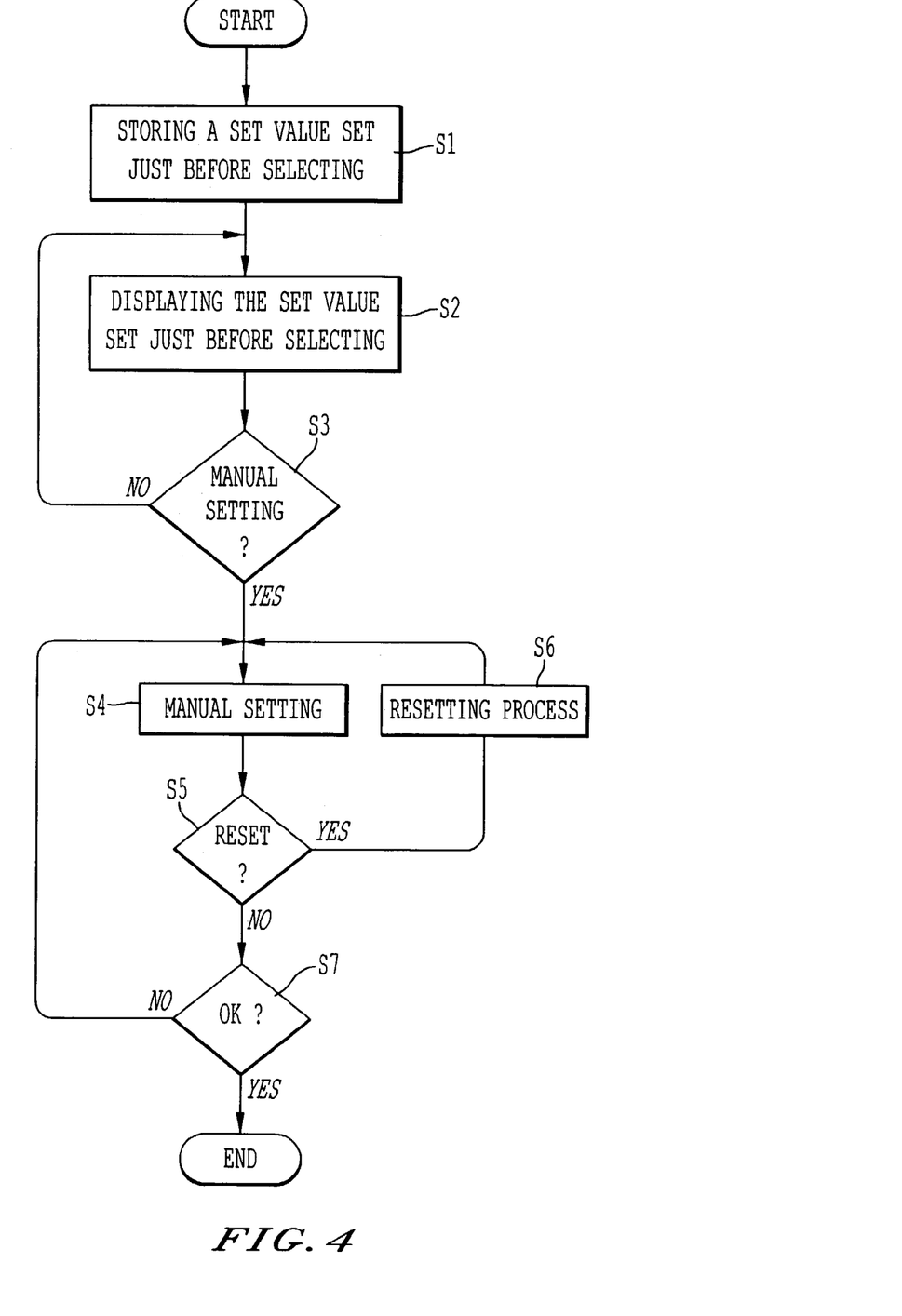
FIG. 4 is a flowchart of a white balance gain setting process in accordance with an exemplary embodiment of the invention.

The white balance setting process initiated by selecting the MWB mode of the exemplary embodiment is explained with reference to a flowchart of FIG. 4 showing a process procedure of the CPU 8a in accordance with the present invention. Operations in the flowchart are executed by the CPU 8a according to the instruction set stored in the memory 8b. The white balance setting process in this embodiment may set the white balance gains corresponding to R and B.

The CPU 8a stores the present set value of white balance gain in the memory 8c as a set value stored prior to selection of MWB mode 103 in step (S1). The CPU 8a displays the present set value display image 200 on the display 7 in step (S2). The present set value display image 200 shows set value stored just before selection of the MWB mode 103 in step S1. The present set value display image 200 includes an R-level gauge 201, a B-level gauge 202, an R-B coordinate graph 205, and the present set value mark 203. The R-level gauge 201 shows a variable range of the white balance gain corresponding to (R). The B-level gauge 202 shows a variable range of the white balance gain corresponding to (B). The R-B coordinate graph 205 is an orthogonal coordinate of the R-level gauge 201 and the B-level gauge 202. The present set value mark 203 points the present set value of both white balance gains corresponding to R and B in the R-B coordinate. Of course, the coordinate gauge may be altered to include a G-level, or any combination of color component axes.

When the manual setting operation is manually adjusted via the adjustment interface 10b of operation interface 10 in step (S3), the CPU 8a executes a manual setting process in step (S4). The manual setting process changes the present set value of the white balance gain according to the degree of manual adjustment. In the manual setting mode 103, the CPU 8a starts a manual setting from the set value set just before selecting in step S2. In other words, when selecting the MWB mode 103 from the AWB mode 101, the manual setting starts from the present set value of the white balance gain controlled automatically just before selecting the MWB mode 103. Conversely, in case of selecting the MWB mode 103 from the outdoor mode 102, the incandescent lamp mode 104 or the fluorescent lamp PWB mode 105, the manual setting starts from the preset value. Since the manual setting process starts from the set value set just before selecting the MWB mode 103, the white balance gain can be finely adjusted from the setting resulting from the last AWB mode 101 or any one of the PWB modes.

In an alternative embodiment, display 7 will provide touchscreen functionality in the area of display image 200 such that the set value mark can be manually oriented by a user through touchscreen "dragging" of the set value mark to a desirable location on the display image 200 (e.g. another coordinate location).

Accordingly, the selective adjustment of the white balance gain in accordance with the present invention is presented in a more systematic and reproducible manner. For example, the CPU 8a adjusts the present set value mark 203 according to the quantity of the adjustment of interface 10b and graphically depicts the corresponding changes during the adjustment process via set value mark 203.

Figure 5:
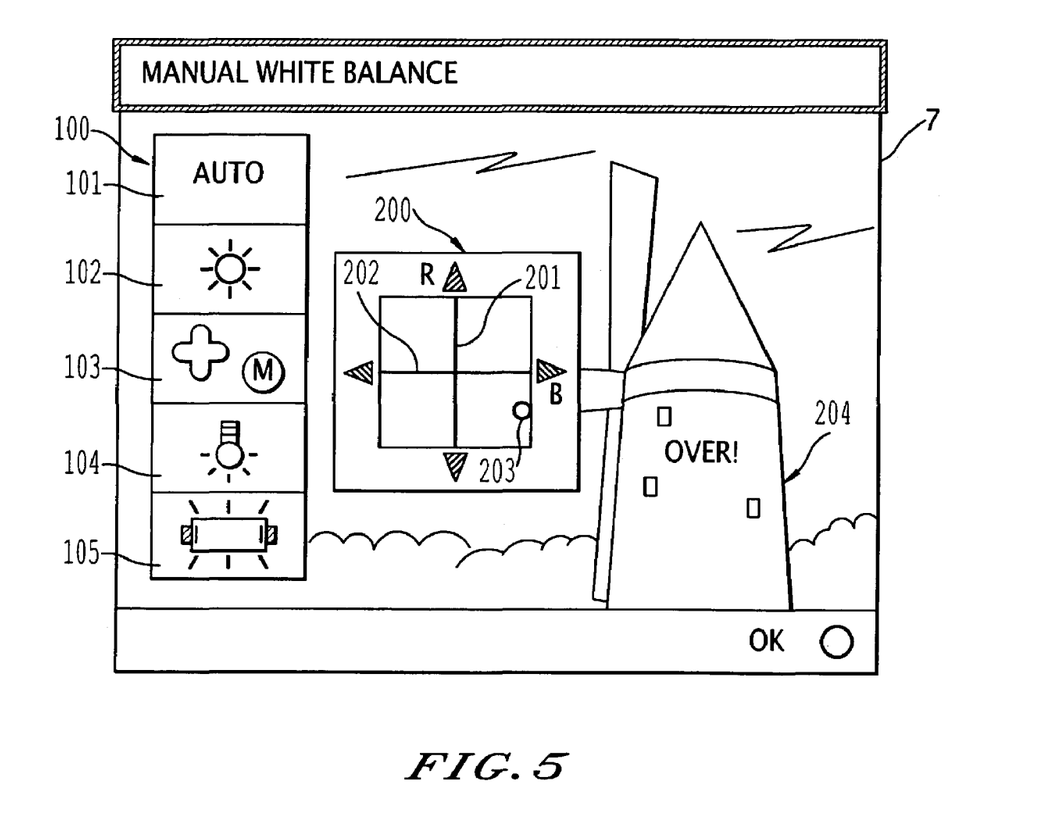
FIG. 5 shows an exemplary screen shot exhibiting an alarm notification in accordance with an exemplary embodiment of the present invention.

Further, when the user executes the manual setting operation such that the set value mark will exceed the range 205 of the white balance gain exhibited on display 7, the CPU 8a displays a warning on the display 7. FIG. 5 shows an example of the warning exhibited on display 7. The CPU 8a displays a warning 204 which indicates that the present set value is made beyond the variable range of the white balance gain on the display 7. In an alternative embodiment, warning 204 may be an audible alert such as a "beep" used alone or in conjunction with the graphic alert shown in FIG. 5.

Since image capture is executed continuously, the manually set white balance control remains applicable. If necessary, the user may actuate a reset button (not shown) of the operation interface ('Y' in step S5), the CPU 8a then resets the present set value of the white balance gain on the set value stored just before selecting the MWB mode 103 in step S1 (S6). After resetting the present set value, the white balance gain setting process returns to step S4.

The user operates a decision button (not shown) in the operation part 10 ('Y' in step S7), when the image 200 of display 7 appears in an acceptable adjusted form (i.e., color). If the decision button is actuated, the CPU 8a sets the present white balance gain as the present set value in memory and ends the white balance gain setting process.

Alternatively, the CPU 8a may adjust the preset set value of the white balance gain via preset interface 10c and display the preset present set value in the present set value display image 200 on the display 7. In this way, the adjustment interface 10c can be used to alter the preset values stored in memory.

By using the imaging device 15 in accordance with the present invention, since the present set value display image 200 is exhibited on the display 7, the present set value in the variable range of the white balance gains can be recognized at a glance. The white balance gains in terms of (R) and (B) color components can be also recognized at a glance. Further, actuating the reset button of the operation interface 10 returns the white balance gains to the value set just before selecting the MWB mode 103.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

What is claimed is:

1. An imaging device comprising:
    a photodetector adapted to translate incident light of an image to a representative electronic signal;
    a white balance control configured to control the white balance of the representative electronic signal in accordance with a white balance gain value;

a selector interface operably linked to the white balance control, the selector interface selecting among a plurality of default preset values to select the white balance gain value in accordance with an imaging application;

a preset interface configured to set each one of the plurality of default preset values of the white balance gain value;

an adjustment interface configured to manually adjust the selected white balance gain value; and a display configured to display information of the selected one of the plurality of default preset values of the white balance gain value, wherein a variable range of the selected white balance gain value is provided, the variable range including an indication of the default preset value, wherein the display is a touchscreen, the touchscreen is configured to display a set value mark which is manually oriented by a user dragging the set value mark to a desirable location, the location of the set mark determining an amount of R-level and B-level used to adjust white balance gain.

2. The imaging device in accordance with claim 1, wherein the plurality of default preset values include two types, each type corresponding to a color specific white balance gain, and, the display providing an orthogonal, graphical depiction corresponding to the variable range of one type relative to the other and the set value mark of each range being indicated by the display.

3. The imaging device of claim 1, wherein the selector interface is a graphical user interface (GUI) of the display.

4. The imaging device of claim 1, wherein the adjustment interface is a graphical user interface (GUI) of the display.

5. The imaging device in accordance with claim 1, further comprising:

an alarm unit configured to give a warning when the user drags the set value mark outside of the range of white balance gain displayed on the touchscreen display.

6. The imaging device in accordance with claim 5, wherein the alarm unit is configured to give an audible warning.

7. The imaging device in accordance with claim 6, wherein the alarm unit is configured to give a visual warning.

8. The imaging device in accordance with claim 1, wherein the default preset values correspond to a incandescent lamp mode, florescent lamp mode, outdoor mode, manual white balance mode, and automatic white balance mode.

9. An imaging device comprising:

photodetector means for translating incident light of an image to a representative electronic signal;

white balance control means for configuring the white balance of the representative electronic signal in accordance with a white balance gain value;

manual selection means operably linked to the white balance control means for selecting among a plurality of default preset values to select the white balance gain value in accordance with an imaging application;

a preset interface means for setting each one of the plurality of default preset values of the white balance gain value;

operation means for manually adjusting the selected white balance gain values; and display means for exhibiting information of the set value, wherein a variable range of the selected white balance gain value is provided, the variable range including an indication of the default preset value, wherein the display means is a touchscreen, the touchscreen is configured to display a set value mark which is manually oriented by a user dragging the set value mark to a desirable location, the location of the set mark determining an amount of R-level and B-level used to adjust white balance gain.

10. The imaging device in accordance with claim 9, wherein the plurality of default preset values include two types, each type corresponding to a color specific white balance gain, and, the display providing an orthogonal, graphical depiction corresponding to the variable range of one type relative to the other and the set value mark of each range being indicated by the display.

11. The imaging device in accordance with claim 9, further comprising:

an alarm unit configured to give a warning when the user drags the set value mark outside of the range of white balance gain displayed on the touchscreen display.

12. An imaging device comprising:

photodetector means for translating incident light of an image to a representative electronic signal;

white balance control means for configuring the white balance of the representative electronic signal in accordance with a white balance gain value;

manual selection means operably linked to the white balance control means for selecting among a plurality of default preset values to select the white balance gain value in accordance with an imaging application;

a preset interface means for setting each one of the plurality of default preset values of the white balance gain value;

adjustment means for manually adjusting the selected white balance gain value;

mode selection means for selecting between a manual setting mode and an automatic mode, the manual setting mode being initiated by the manual selection means and the manual selection means utilizes a default preset value provided for the manual setting mode; and display means for exhibiting information of the default preset value provided for the manual setting mode, wherein a variable range of the set white balance gain value is provided, the variable range including an indication of the selected value of the plurality of default preset values and a graphical representation thereof, relative to the degree of adjustment applied via the adjustment interface, wherein the display means is a touchscreen, the touchscreen is configured to display a set value mark which is manually oriented by a user dragging the set value mark to a desirable location, the location of the set mark determining an amount of R-level and B-level used to adjust white balance gain.

13. The imaging device in accordance with claim 12, further comprising:

memory means for storing the default preset value provided for the manual setting mode set just before the manual setting mode is selected; and reset means for resetting the white balance gain on the default preset value provided for the manual setting mode stored by the memory means during the manual setting mode.

14. A method of setting a white balance gain value of an imaging device, the method comprising the steps of:
   translating incident light of an image to a representative electronic signal;
   configuring the white balance of the representative electronic signal in accordance with a white balance gain value;
   receiving a selection from among a plurality of default preset values to select the white balance gain value in accordance with an imaging application;
   setting each one of the plurality of default preset values of the white balance gain value;
   receiving a command from a touchscreen display via a user dragging a set value mark to a desirable location, the location of the set mark determining an amount of R-level and B-level used to adjust the selected white balance gain value of the plurality of predetermined values; and
   displaying information of the selected white balance gain value,
   wherein a variable range of the selected white balance gain value is provided, the variable range including an indication of the default preset value.

15. The method of claim 14, further comprising the step of:
   selecting between a manual setting mode and an automatic mode, the manual setting mode being initiated by the manual selection means and the manual selection means utilizes a default preset value provided for the manual setting mode.

16. The method of claim 14, further comprising the step of:
   warning the user when the user drags the set value mark outside of the range of white balance gain displayed on the touchscreen display.

17. A computer readable medium having encoded thereon computer program instructions that cause a computer to implement a method of setting a white balance gain value of an imaging device, the method comprising the steps of:
   translating incident light of an image to a representative electronic signal;
   configuring the white balance of the representative electronic signal in accordance with a white balance gain value;
   receiving a selection from among a plurality of default preset values to select the white balance gain value in accordance with an imaging application;
   setting each one of the plurality of default preset values of the white balance gain value;
   adjusting the white balance gain value;
   displaying information of the selected default preset value, wherein a variable range of the set white balance gain value is provided, the variable range including an indication of the selected value of the default preset value; and
   receiving a command from a touchscreen display via a user dragging a set value mark to a desirable location, the location of the set mark determining an amount of R-level and B-level used to adjust white balance gain.

* * * * *